United States Patent
Otaki et al.

(10) Patent No.: US 6,908,405 B2
(45) Date of Patent: Jun. 21, 2005

(54) PULLEY WIDTH ADJUSTING DEVICE FOR CONTINUOUSLY VARIABLE TRANSMISSION

(75) Inventors: Ryoichi Otaki, Fujisawa (JP); Hideki Hashitani, Hanyu (JP)

(73) Assignee: NSK Ltd., Tokyo (JP)

( * ) Notice: Subject to any disclaimer, the term of this patent is extended or adjusted under 35 U.S.C. 154(b) by 0 days.

(21) Appl. No.: 10/833,503

(22) Filed: Apr. 28, 2004

(65) Prior Publication Data

US 2004/0235596 A1 Nov. 25, 2004

Related U.S. Application Data

(63) Continuation of application No. PCT/JP02/11436, filed on Nov. 1, 2002.

(30) Foreign Application Priority Data

Nov. 2, 2001 (JP) ........................................ 2001-338129

(51) Int. Cl.⁷ ................................................ F16H 1/10
(52) U.S. Cl. ........................................ 474/39; 74/89.34
(58) Field of Search ................................ 474/8, 10, 11, 474/19, 46, 39, 42, 17; 74/89.23, 89.34

(56) References Cited

U.S. PATENT DOCUMENTS 4,735,598 A 4/1988 Moroto et al.
5,094,118 A * 3/1992 Morita ...................... 74/89.31

FOREIGN PATENT DOCUMENTS

| | | | | |
|---|---|---|---|---|
| FR | 1399664 A | * | 4/1965 | |
| JP | 58-138848 U | | 9/1983 | |
| JP | 60-173753 U | | 11/1985 | |
| JP | 63009547 A | * | 1/1988 | ............... B41J/3/04 |
| JP | 5-14720 U | | 2/1993 | |
| JP | 06053851 A | * | 2/1994 | ............ H03G/3/34 |
| JP | 7-119805 A | | 5/1995 | |
| JP | 8-33170 B2 | | 3/1996 | |
| JP | 2852994 B2 | | 11/1998 | |
| JP | 2000-283253 A | | 10/2000 | |
| JP | 2002-130417 A | | 5/2002 | |
| JP | 2002-349652 A | | 12/2002 | |
| JP | 2003-97656 A | | 4/2003 | |
| JP | 2003-120782 A | | 4/2003 | |
| WO | WO 03/038310 A1 | | 5/2003 | |

* cited by examiner

Primary Examiner—David A. Bucci
Assistant Examiner—Vicky A. Johnson
(74) Attorney, Agent, or Firm—Christensen O'Connor Johnson Kindness PLLC

(57) ABSTRACT

A ball screw mechanism that can drive a movable pulley disk in an axial direction includes a screw cylinder and a nut member. A stopper pin is inserted through the screw cylinder from one end surface of the circumferential wall of the screw cylinder to the other end surface. As an end portion of the stopper pin is engaged with a notch portion of a transmission case, the rotation of the screw cylinder is inhibited. A stopper projection is provided on the nut member. As the other end portion of the stopper pin abuts against the stopper projection, the rotation range of the nut member is regulated. The stopper projection and the stopper pin function as excessive fastening preventing means for preventing the excessive fastening of the ball screw mechanism.

1 Claim, 2 Drawing Sheets

PULLEY WIDTH ADJUSTING DEVICE FOR CONTINUOUSLY VARIABLE TRANSMISSION

CROSS-REFERENCE TO RELATED APPLICATIONS

This is a Continuation Application of PCT Application No. PCT/JP02/11436, filed Nov. 1, 2002, which was not published under PCT Article 21(2) in English.

This application is based upon and claims the benefit of priority from prior Japanese Patent Application No. 2001-338129, filed Nov. 2, 2001, the entire contents of which are incorporated herein by reference.

BACKGROUND OF THE INVENTION

1. Field of the Invention

The present invention relates to a pulley width adjusting device for a belt-type continuously variable transmission used for automobiles, industrial machines and the like.

2. Description of the Related Art

Belt-type continuously variable transmissions are used in some automobiles, industrial machines and the like. Each belt-type continuously variable transmission includes a pulley provided on a rotation shaft on a driving side (primal pulley), another pulley provided on a rotation shaft on a driven side (secondary pulley) and an endless belt that is put across these pulleys.

Each of the above-described pulleys includes a fixed pulley disk that is faced to the rotation shaft and a movable pulley disk. The fixed pulley disk is integrated with the rotation shaft. The movable pulley disk is formed non-rotatable with regard to the rotation shaft but movable in the axial direction. The movable pulley disk is moved in the axial direction of the rotation shaft by an actuator. As it is moved, the distance between the fixed pulley disk and the movable pulley disk, that is, the pulley width, is changed.

In order to change the rotation speed rate between the rotation shaft on the driving side and that of the driven side, the pulley width on the driving side and the pulley width on the driven side are changed synchronously in directions opposite to each other. For example, in the case where the secondary pulley is changed in an accelerating side, the pulley width of the primary pulley is narrowed and the pulley width of the secondary pulley is widened. In this manner, the endless belt is moved to the outer circumferential side of the primary pulley and the endless belt is moved to the central portion of the secondary pulley.

A ball screw mechanism is used as a means for moving the movable pulley disk in the axial direction of the rotation shaft. The ball screw mechanism includes a screw cylinder provided on an outer circumference of the rotation shaft and a nut member engaged with the outer circumference of the screw cylinder via a plurality of balls. Each ball is contained between a screw groove formed in the outer circumference of the screw cylinder and a screw groove formed in an inner circumference of the nut member. The screw cylinder is fixed to a transmission case for use as a supporting member. The nut member is rotatable with respect to the movable pulley disk and movable in the axial direction of the rotation shaft together with the movable pulley disk.

When the nut member is rotated by a driving source such as a motor, the nut member is moved in the axial direction of the rotation shaft together with the movable pulley disk. As it is moved so, the pulley width between the movable pulley disk and the fixed pulley disk is changed.

The screw cylinder is placed via a bearing on the outer circumference of the rotation shaft to be coaxially therewith. An end portion of the screw cylinder is inserted with a pressure to a recess portion made in the transmission case together with the bearing. By this insertion with pressure, the screw cylinder is fixed to the transmission case. The rotation shaft that runs through an inner side of the screw cylinder can be rotated via the bearing.

As described above, the conventional technique has such a structure that an end portion of the screw cylinder is pushed into the recess portion formed in the transmission case. For this structure, a fit margin must be provided at the end portion of the screw cylinder for press-fit. Therefore, the structure of the screw cylinder becomes complicated and the size increases, which results in the increase in the production cost. Further, the screw cylinder must be inserted with a pressure into the recess portion together with the bearing while the end portion of the screw cylinder is combined with the bearing. Therefore, the assembly operation is laborious, and thus the assembly efficiency is undesirably decreased.

Accordingly, the object of the present invention is to provide a pulley width adjusting device for a continuously variable transmission, having a simple structure that can easily fix a screw cylinder to a support member such as a transmission case at a high efficiency.

BRIEF SUMMARY OF THE INVENTION

According to an aspect of the present invention, there is provided a pulley width adjusting device for a continuously variable transmission, comprising: a rotation shaft provided rotatably on a support member via a bearing; a fixed pulley disk integrated with the rotation shaft; a movable pulley disk provided non-rotatably but movably in an axial direction on the rotation shaft to be opposite to the fixed pulley disk; and a ball screw mechanism including a screw cylinder provided on an outer circumference of the rotation shaft and a nut member provided on an outer circumference of the screw cylinder, wherein as the nut member rotates with respect to the screw cylinder, the nut member moves in an axial direction of the screw cylinder to drive the movable pulley disk in the axial direction, thereby varying a pulley width between the fixed pulley disk and the movable pulley disk, wherein the pulley width adjusting device further comprises: a stopper pin inserted through the screw cylinder from an end surface of a circumferential wall thereof to an other end surface, having an end portion projecting from an end surface of the screw cylinder and an other end portion projecting from the other end surface of the screw cylinder; and a stopper projection that rotates together with the nut member, and one end portion of the stopper pin forming rotation inhibiting means for inhibiting rotation of the screw cylinder when it engages with the support member, and the other end of the stopper pin forming excessive fastening preventing means for regulating a rotation range of the nut member when it abuts against the stopper projection as the nut member rotates by a predetermined amount.

With the present invention, which has a simple mechanism in which the stopper pin, which functions as the rotation inhibiting means and excessive fastening preventing means, is engaged with a support member such as the transmission case, it is possible to easily fix the crew cylinder to the support member at a high efficiency. Therefore, the cost for the ball screw mechanism is reduced and the mechanism can be assembled at a high efficiency.

DETAILED DESCRIPTION OF THE INVENTION

A pulley width adjusting device according to an embodiment of the present invention will now be described with reference to accompanying drawings.

Figure 1:
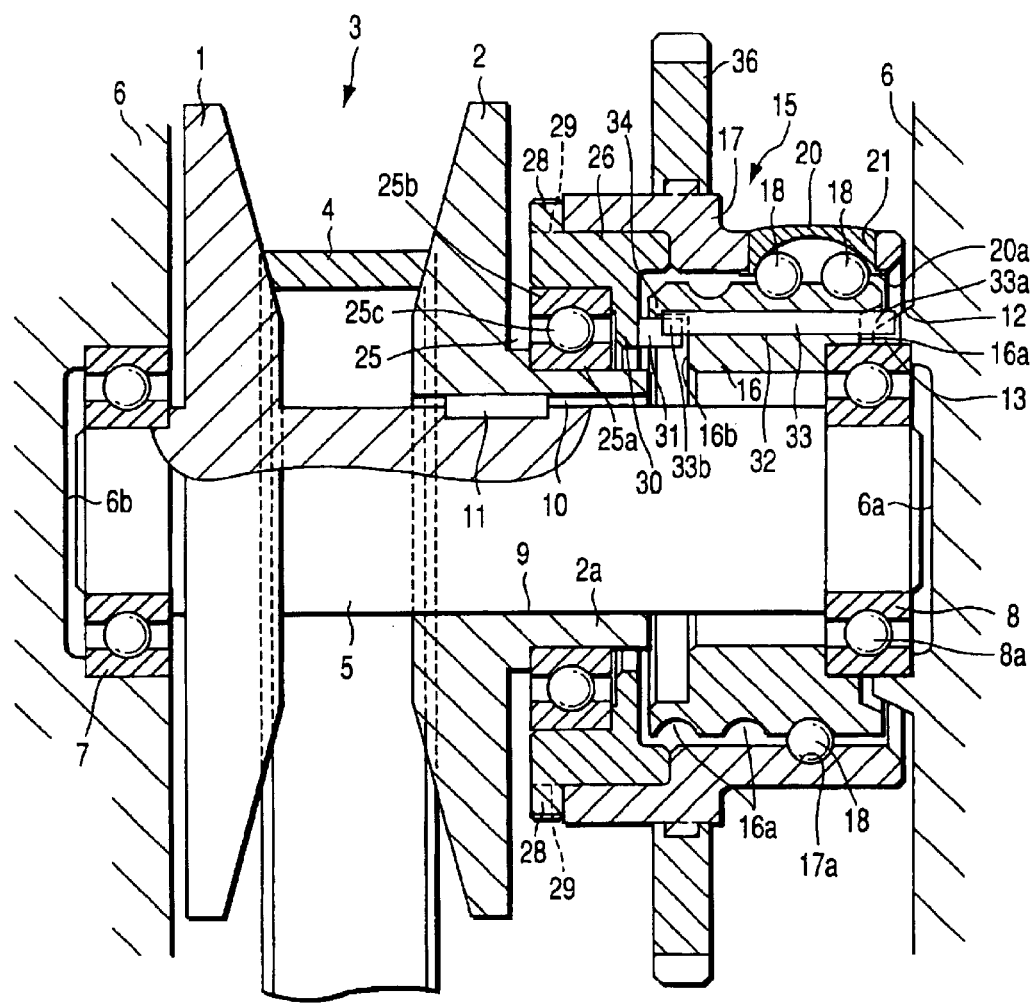
FIG. 1 is a cross section of a pulley width adjusting device for a continuously variable transmission, according to an embodiment of the present invention.

FIG. 1 illustrates a pulley 3 for a belt-type continuously variable transmission, which includes a fixed pulley disk 1 and a movable pulley disk 2. An endless belt 4 is put across the pulley 3.

The pulley 3 includes a rotation shaft 5. Both end portions of the rotation shaft 5 are rotatably supported by a transmission case 6 that serves as a support member via bearings 7 and 8, respectively.

The fixed pulley disk 1 is formed to be integrated with the rotation shaft 5. The movable pulley disk 2 is set to face the fixed pulley disk 1. The movable pulley disk 2 is provided on an outer circumference of the rotation shaft 5 to be non-rotatable but movable in the axial direction of the rotation shaft 5.

In more detail, the movable pulley disk 2 includes a fit hole 9 at its central portion. The fit hole 9 is slidably fit with the rotation shaft 5. At a part of a circumferential surface of the fit hole 9, a key groove 10 that extends in its axial direction is formed. On the circumferential surface of the rotation shaft 5, a key 11 is mounted along its axial direction. The key 11 is slidably fit with the key groove 10. With this structure, the movable pulley disk 2 is supported to be movable in the axial direction of the rotation shaft 5 but not rotatably in relative to the rotation shaft 5.

The bearings 7 and 8 that support the rotation shaft 5 are fixed as they are fit inside fit recess portions 6a and 6b formed in the transmission case 6.

Figure 2:
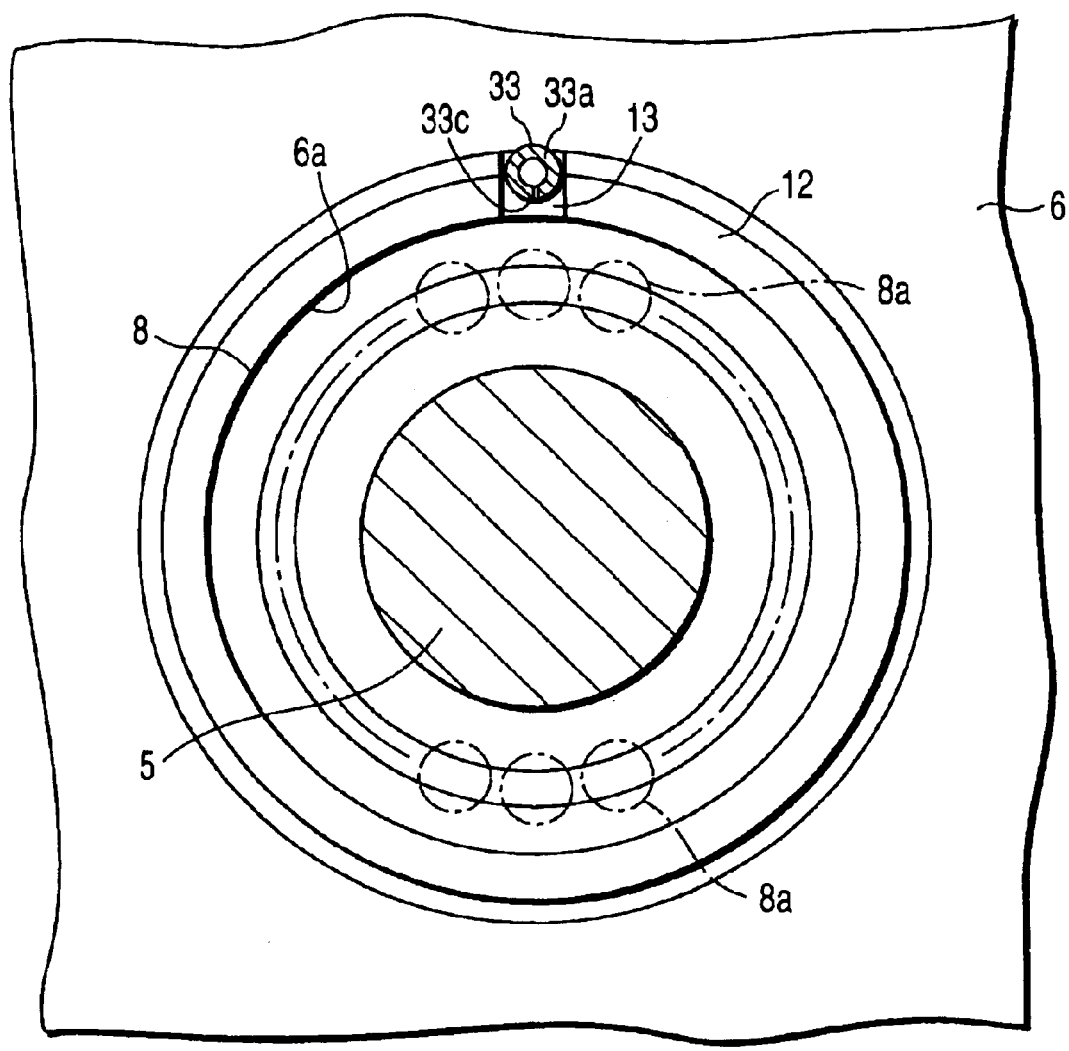
FIG. 2 is a cross section of a main part of the pulley width adjusting device for a continuously variable transmission, shown in FIG. 1.

One of the fit recess portions formed in the transmission case 6, namely, recess portion 6a, is defined by a space inside a projecting portion 12 formed in a ring shape as shown in FIG. 2. A notch portion 13 is formed in a part of the projecting portion in its circumferential direction.

A ball screw mechanism 15 is provided between the movable pulley disk 2 and the transmission case 6. The ball screw mechanism 15 serves as an actuator that moves the movable pulley disk 2 in the axial direction. The ball screw mechanism 15 includes a screw cylinder 16, a nut member 17 and a plurality of balls 18 serving as rolling elements. The screw cylinder 16 is coaxially placed on the outer circumference of the rotation shaft 5. An end portion of the screw cylinder 16 is fit with the bearing 8.

The nut member 17 is coaxially placed on the outer circumference of the screw cylinder 16. Helical ball screw grooves 16a and 17a are formed in an inner circumferential surface of the nut member 17 and an outer circumferential surface of the screw cylinder 16, respectively. The balls 18 are rollably loaded between the ball screw grooves 16a and 17a. The balls 18 are arranged along the ball screw grooves 16a and 17a. With this structure, as the nut member 17 is rotated, each of the balls 18 rolls along the ball screw grooves 16a and 17a and the nut member 17 moves in the axial direction of the screw cylinder 16.

The ball screw groove 16a of the screw cylinder 16 is formed to have a helical length for two or more pitches. On the other hand, the ball screw groove 17a of the nut member 17 is formed to have a helical length for one pitch. A deflector 20 is provided on a part of the circumferential surface of the nut member 17 in order to make the balls 18 circulate endlessly. The deflector 20 serves to endlessly circulate the balls 18 that roll along the ball screw groove 17a for one pitch of the nut member 17 by returning them from one end portion of the ball screw groove 17a to the other end portion.

The deflector 20 is made of a resin formed with injection mold or of a sintered metal. A flange 20a is formed in an inner edge of the deflector 20. A fit hole 21, which is designed for the deflector 20, is formed at a part of the circumferential surface of the nut member 17. The deflector 20 is fit into the fit hole 21 from inside of the nut member 17 and thus it is fixed to the nut member 17. The flange 20a of the deflector 20 is set to abut against the inner circumferential surface of the nut member 17.

As described above, the ball screw mechanism 15 has a deflector type ball screw mechanism of a single thread and a single row. Therefore, the ball screw mechanism 15 is made compact in the measurements in the axial direction, and is able to allow a slight inclination between the screw cylinder 16 and the nut member 17. The ball screw mechanism 15, with such a structure, is advantageous for the moment load acting on the pulley 3.

The nut member 17 of the ball screw mechanism 15 is mounted to the movable pulley disk 2 via a bearing 25 and a bearing holder 26. A boss portion 2a is formed at a center portion of a rear surface of the movable pulley disk 2. The bearing 25 is provided on an outer circumference of the boss portion 2a.

The bearing 25 includes an inner race 25a, an outer race 25b and a plurality of balls 25c rollably loaded between the inner race 25a and outer race 25b. The inner race 25a is fixed to the outer circumference of the boss portion 2a of the movable pulley disk 2 as it is fit therewith.

The bearing holder 26, which has a cylindrical shape, is provided between an outer circumferential surface of the outer race 25b and an inner circumferential surface of one end portion of the nut member 17. A pair of projecting portions 28 are formed on the outer circumferential portion of the bearing holder 26 such as to be located on opposite sides to each other with respect to the rotation shaft 5. A pair of recess portions 29 that respectively correspond to the projecting portions 28 are formed on an end surface of the nut member 17. The projecting portions 28 are respectively fit into the recess portions 29. As they fit, the bearing holder 26 is inhibited from rotating with respect to the nut member 17. Therefore, the nut member 17 and the bearing holder 26 can be rotated together.

The nut member 17 and the bearing holder 26 are supported rotatably by the movable pulley disk 2 with the bearing 25. Further, the nut member 17 and the bearing holder 26 can be moved together with the movable pulley disk 2 in the axial direction of the rotation shaft 5.

A ring-like collar 30 that projects to the inner side of the bearing holder 26 is formed on the inner circumferential portion of the bearing holder 26. One side surface of the collar 30 is brought into contact with an end surface of the outer race 25b of the bearing 25. A stopper projection 31 is formed at a portion of the other side surface of the collar 30. The stopper projection 31 extends towards the screw cylinder 16.

An insertion hole 32 is formed in a part of the circumferential wall of the screw cylinder 16 such as to pierce through from one end surface 16a of the cylinder 16 to the other end surface 16b. A stopper pin 33 is inserted to the insertion hole 32. The stopper pin 33 is a spring pin made of, for example, a metal pipe, and a slit 33c (shown in FIG. 2) is made along its axial direction. As the stopper pin 33 is inserted to the insertion hole 32 while reducing its diameter, and thus it is fixed to the insertion hole 32 due to the elastic restoration force of the stopper pin 33 itself.

The stopper pin 33 has both end portions 33a and 33b. The stopper pin 33 is inserted to the insertion hole 32 such that the both end portions 33a and 33b project respectively from the end surfaces 16a and 16b of the screw cylinder 16. One end portion 33a of the stopper pin 33, that projects from one end surface 16a of the screw cylinder 16 is inserted to the notch 13 formed in the transmission case 6 as shown in FIG. 1 and FIG. 2.

As the end portion 33a of the stopper pin 33 is inserted to the notch 13, the screw cylinder 16 and the transmission case 6 are engaged with each other. In this manner, the screw cylinder 16 is inhibited from rotating with respect to the transmission case 6, and the rotation shaft 5 running through the inside of the screw cylinder 16 can rotate with respect to the screw cylinder 16.

A projecting portion 34 is formed on the inner circumferential surface of the screw cylinder 16. The other end portion 33b of the stopper pin 33 projects from the other end surface 16b of the screw cylinder 16. As the end surface of the end portion 33b abuts against the projecting portion 34, the stopper pin 33 is inhibited from moving with respect to the screw cylinder 16 in the axial direction.

The end portion 33b of the stopper pin 33 is placed at a position corresponding to that of the stopper projection 31 formed on the bearing holder 26. As the nut member 17 provided on the outer circumferential side of the screw cylinder 16 is rotated with respect to the screw cylinder 16, the nut member 17 is moved in the axial direction of the screw cylinder 16. When the nut member 17 is moved by a certain distance in the direction away from the fixed pulley disk 1, the stopper projection 31 abuts against the side surface of the end portion 33b of the stopper pin 33. In this manner, the nut member 17 is inhibited from further rotating, and thus a so-called excessive fastening by the nut member 17 can be prevented.

A drive gear 36 that uses, for example, a spur gear is provided on an outer circumferential portion in a middle portion of the nut member 17. Since a rotational force of a drive source such as a motor is transmitted to the nut member 17 by means of the drive gear 36, the nut member 17 can be rotated in both of clockwise and counter-clockwise directions.

The stopper pin 33 is inserted to the insertion hole 32 of the screw cylinder 16 from one end surface 16a of the screw cylinder 16 until it abuts against the projection 34 before mounting the pulley 3 to the transmission case 6. In the above-described state, the pulley 3 is mounted to the transmission case 6. As the pulley 3 is mounted, one end portion 33a of the stopper pin 33 is inserted to the notch portion 13 of the transmission case 6. In this manner, the stopper pin 33 is set at a desired position. Further, since the movement of the stopper pin 33 in the axial direction is regulated by the projection 34 and the wall surface of the notch portion 13, the falling-off of the stopper pin 33 can be prevented.

Next, the operation of the continuously variable transmission of the above-described embodiment during shifting will now be described. FIG. 1 illustrates a state where the distance between the pulley disks 1 and 2, that is, the pulley width is at the largest. At this state, the stopper projection 31 abuts against the side surface of the end portion 33b of the stopper pin 33.

From this state, as the nut member 17 is rotated in a clockwise direction (the first direction) by the drive source, the nut member 17 moves in the direction towards the fixed pulley disk 1 via the balls 18 together with that rotation. The balls 18 are inserted between the screw groove 17a of the nut member 17 and the screw groove 16a of the screw cylinder 16. As the nut member 17 moves towards the fixed pulley disk 1, the movable pulley disk 2 moves together with the nut member 17 in the axial direction of the rotation shaft 5. Therefore, the distance between the pulley disks 1 and 2 (that is, the pulley width) is narrowed.

On the other hand, when the nut member 17 is rotated in the counter-clockwise direction (the second direction), the nut member 17 moves in the direction away from the fixed pulley disk 1 via the balls 18. When the nut member 17 moves in this direction, the movable pulley disk 2 is moved together with the nut member 17 in the direction away from the fixed pulley disk 1 by a pressure force of the endless belt 4. Thus, the distance between the pulley disks 1 and 2 is expanded.

When the nut member 17 is rotated in the second direction and the nut member 17 is distant from the fixed pulley disk 1 by a predetermined amount, the stopper projection 31 abuts against the side surface of the end portion 33b of the stopper pin 33. Due to this abutment, the nut member 17 is inhibited from further rotating, and thus the excessive fastening of the ball screw mechanism 15 can be prevented.

As the pulley width varies as described above, the endless belt 4 displaces in a radial direction of the pulley 3. Thus, the transmittal ratio of the rotation transmitted from the primary pulley of the driving side to the secondary pulley of the driven side via the endless belt 4 varies in a stepless manner.

As the end portion 33a of the stopper pin 33 is inserted to the notch portion 13 formed in the transmission case 6, the screw cylinder 16 of the ball screw mechanism 15 is inhibited from rotating with respect to the transmission case 6. Therefore, it is not necessary to form a fit margin at the end portion of the screw cylinder for press-fit as in the conventional case. For this reason, the screw cylinder 16 can have a simple and small structure, thereby making it possible to lower the cost. Further, when assembling the ball screw mechanism 15 to the transmission case 6, it is no longer necessary to carry out such a laborious operation that the end portion of the screw cylinder is press-fit into the recess portion of the transmission case while setting it on the bearing as in the conventional technique. In other words, according to this embodiment, merely by inserting the end portion 33a of the stopper pin 33 into the notch portion 13 of the transmission case 6, the screw cylinder 16 is fixed to the transmission case 6. In this manner, the ball screw mechanism 15 for continuously variable transmission can be easily assembled at a high efficiency.

As described above, the stopper pin 33 functions as means for stopping the rotation of the screw cylinder 16, and further the stopper pin 33, in cooperation with the stopper projection 31, functions as means for preventing the excessive fastening of the ball screw mechanism 15. In other words, the single stopper pin 33 serves as a member for stopping the rotation of the screw cylinder 16 and a member for preventing the excessive fastening of the ball screw mechanism 15 at the same time. Therefore, the number of parts used in the mechanism is reduced, and accordingly the product cost is lowered.

It should be noted that in the embodiment, the nut member 17 and the bearing holder 26 are made of separate components, but the nut member 17 and the bearing holder 26 may be formed as an integrated member.

The pulley width adjusting device of the present invention can be applied not only to a belt-type continuously variable transmission employed in automobiles or industrial machines, but also it can be applied to a belt-type continuously variable transmission employed in various types of machines.

What is claimed is:

1. A pulley width adjusting device for a continuously variable transmission, comprising:

a rotation shaft provided rotatably on a support member via a bearing;

a fixed pulley disk integrated with the rotation shaft;

a movable pulley disk provided non-rotatably but movably in an axial direction on the rotation shaft to be opposite to the fixed pulley disk; and a ball screw mechanism including a screw cylinder provided on an outer circumference of the rotation shaft and a nut member provided on an outer circumference of the screw cylinder, wherein as the nut member rotates with respect to the screw cylinder, the nut member moves in an axial direction of the screw cylinder to drive the movable pulley disk in the axial direction, thereby varying a pulley width between the fixed pulley disk and the movable pulley disk, wherein the pulley width adjusting device further comprises:

a stopper pin inserted through the screw cylinder from an end surface of a circumferential wall thereof to an other end surface, having an end portion projecting from an end surface of the screw cylinder and an other end portion projecting from the other end surface of the screw cylinder; and a stopper projection rotating together with the nut member, the one end portion of the stopper pin forming rotation inhibiting means for inhibiting rotation of the screw cylinder when it engages with the support member, and the other end of the stopper pin forming excessive fastening preventing means for regulating a rotation range of the nut member when it abuts against the stopper projection as the nut member rotates by a predetermined amount.

* * * * *